(No Model.) 2 Sheets—Sheet 2.
J. MUNDEN.
CHANGE SPEED GEARING FOR BICYCLES.
No. 559,784. Patented May 5, 1896.
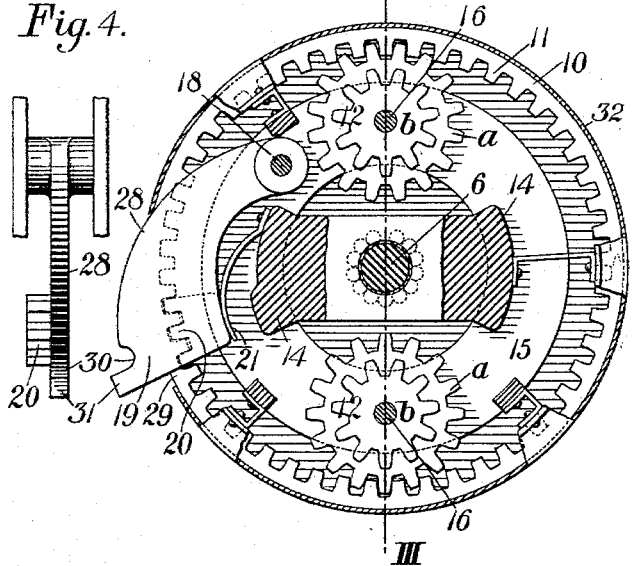
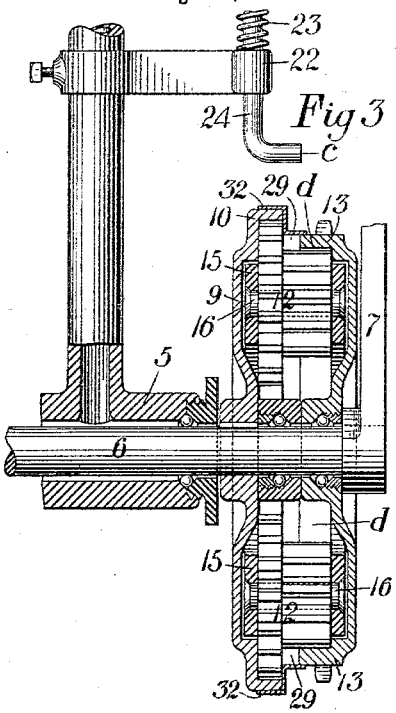
WITNESSES
INVENTOR
Joseph Munden
his Attorney.

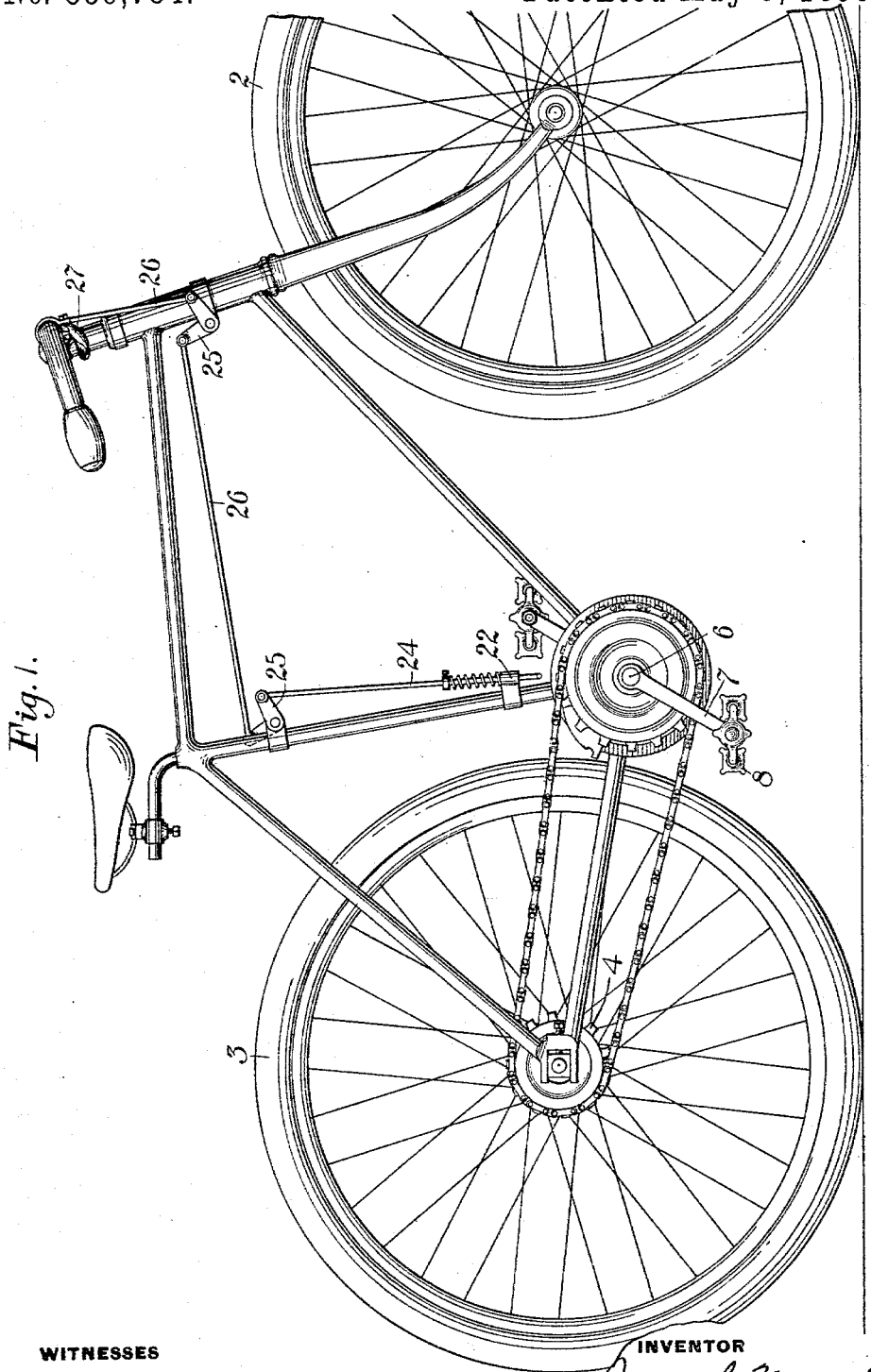

UNITED STATES PATENT OFFICE.

JOSEPH MUNDEN, OF BRADENVILLE, PENNSYLVANIA, ASSIGNOR OF TWO-THIRDS TO WILLIAM R. CHRISTIAN, OF PITTSBURG, AND SAMUEL A. WENTLY, OF WEST ELIZABETH, PENNSYLVANIA.

CHANGE-SPEED GEARING FOR BICYCLES.

SPECIFICATION forming part of Letters Patent No. 559,784, dated May 5, 1896.

Application filed June 26, 1895. Serial No. 554,060. (No model.)

*To all whom it may concern:*

Be it known that I, JOSEPH MUNDEN, a citizen of the United States, residing at Bradenville, in the county of Westmoreland and State of Pennsylvania, have invented or discovered a new and useful Improvement in Change-Speed Gearing for Bicycles, of which the following is a full, clear, and exact description, reference being had to the accompanying drawings, forming part of this specification, in which—

Figure 1 is a view in side elevation of a bicycle provided with my improved change-speed gearing. Fig. 2 is an interior face view of the power-wheel and operative mechanism, the sprocket-wheel being lifted away. Fig. 3 is a vertical sectional view taken on the line III III of Fig. 2. Fig. 4 is a detail edge view of the locking-arm.

Like letters and numerals of reference refer to like parts wherever used throughout this specification.

The object of my invention is to provide a change-speed gearing for bicycles and other vehicles propelled by foot-power whereby the available power, as applied to the crank-axle by the pressure on the pedals, may be applied through intermediate gearing to the driven wheel, usually a sprocket-wheel, so as to vary the speed of such driven wheel when desired, causing the machine to be propelled at varying speeds when the crank-axle is revolving at a uniform velocity. The principal advantage of such a construction is found in ascending grades, when by the application of the ordinary power the machine may be propelled with equal ease, but at a reduced speed, as on level ground.

Referring to the drawings, 2 3 are the wheels of a "safety" type of bicycle, the rear one 3 being provided with the customary sprocket-wheel 4.

Journaled in the bearing 5 of the frame is the usual crank-axle 6, provided with the ordinary cranks 7 and pedals 8. To the axle 6 is keyed or otherwise secured the power-wheel 9, provided with a flange 10 and internal gear-teeth 11 in mesh with the larger wheel *a* of one or more combination idler-wheels 12, the smaller wheel *b* of which is in mesh with the internally-toothed sprocket-wheel 13, provided with teeth *d*, loosely journaled on the axle 6. Between the wheels 9 and 13, and also loosely journaled on the axle, is the frame 14, having the two circular side pieces 15, between which are secured the idler-wheels 12, journaled on the pins 16. It will thus be seen that when power is applied to the wheel 9 through the axle rotary motion of a reduced speed but greater power will be transmitted through the wheels *a* and *b* to the sprocket-wheel 13, and from it through the chain 17 to the sprocket-wheel 4 on the rear wheel in the ordinary manner. This construction accomplishes the desired result of revolving the sprocket-wheel in the same direction as the cranks are revolving at a reduced speed, thus enabling a rider to ascend grades of considerable degree without any additional effort.

For the purpose of maintaining a relatively high speed, as in the ordinary construction and as usually employed in practice on level roads, I have provided means for securing the wheels together so that they shall all revolve at a uniform rate, as is the case when the sprocket-wheel is secured direct on the axle. Pivoted at 18, between the side pieces 15 of the revolving frame 14, is a locking-dog 19, provided with teeth 20, designed to intermesh with the teeth 11, thus securely locking all the parts together, so that they will revolve uniformly around the axle 6, the wheels 12 remaining inert. A spring 21 serves to hold the teeth in engagement until released by the means I shall now describe. Secured in a vertical guideway 22, attached to the frame and normally held out of engagement with the dog by a spring 23, is a rod 24, operated, through cranks 25 and rods 26, by the handle
27. The dog 19 is provided with an inclined edge 28, extending out through the slot 29 between the wheels 9 and 13, and with a socket 30 and heel 31, so that when, in case slow gear is desired, the rod 24 is lowered, so that the lower end *c* will contact with the edge 28, the dog will be depressed, throwing the teeth 20 out of engagement, and the end *c* will seat itself in the socket 30 and against the heel 31, permanently holding it out of engagement, resulting in the slow speed, as already described, until the handle 27 is released, when the teeth 20 of the dog will become reëngaged under action of the spring 21. A dust-shield 32 may be secured at intervals to the revolving frame 14, thus preventing the entrance of foreign matter through the slot 29.

Wherever desired ball-bearings may be used to advantage to reduce friction of the various parts, and I have indicated such construction in the drawings.

Changes and modifications may be made in my invention, without departing therefrom, by the skilled mechanic—as, for instance, the number, size, and proportions of the intermediate combination idler-wheels 12 may be changed to advantage to suit different requirements of work. It may be applied to many other uses where an intermittent speed of a uniform power is wished to be applied, and such applications are within the scope of my invention, since I do not wish to be confined to its use on a bicycle alone. The teeth $d$ of the sprocket-wheel may also be constructed as ordinary spur-teeth and made to intermesh with a train of gearing or other application of power.

Having described my invention and in what manner it operates, what I claim, and desire to secure by Letters Patent, is—

1. In combination with a driving-wheel provided with internal spur-teeth, secured to a power-shaft, and a driven wheel similarly provided with internal spur-teeth, journaled on the shaft; a supporting-frame revolubly mounted on the shaft between the driving and driven wheels, and one or more intermediate toothed pinions journaled in the supporting-frame, substantially as set forth.

2. In combination with a driving-wheel provided with internal spur-teeth secured to a power-shaft, and a driven wheel similarly provided with internal spur-teeth journaled on the shaft; a supporting-frame revolubly mounted on the shaft between the driving and driven wheels, one or more intermediate toothed pinions, having two sets of teeth intermeshing with the driving and driven wheels respectively, and a locking-dog pivoted to the revolving frame and provided with teeth designed to intermesh with the teeth of the driving-wheel, substantially as set forth.

3. In a change-speed gearing consisting of a driving-wheel secured to a power-shaft, a driven wheel journaled to the shaft, and intermediate gearing in mesh with the driving and driven wheels respectively, mounted in a revolving frame journaled on the shaft; a locking-dog pivoted between the sides of the revolving frame provided with teeth held in mesh with the teeth of the driving-wheel by a spring secured to the revolving frame, and having a sloping edge projecting through the slot between the driving and driven wheels, and means for depressing the locking-dog out of engagement with the driving-wheel, substantially as set forth.

4. In a change-speed gearing consisting of a driving-wheel, a driven wheel, and intermediate toothed wheels in mesh with both wheels, journaled to a revolving frame between the driving and driven wheels; a dust-shield secured to the revolving frame, and covering the slot between the driving and driven wheels respectively, substantially as set forth.

5. A change-speed gearing for bicycles, comprising an internally-toothed driving-wheel secured to the pedal-shaft, an internally-toothed sprocket-wheel journaled on the shaft in gear with the rear sprocket-wheel by a sprocket-chain, intermediate toothed gearing in mesh with the driving-wheel and driven wheel respectively, mounted on a revolving frame, journaled on the shaft, a locking-dog pivoted to the frame, projecting out through a slot between the driving and driven wheels, provided with a sloping edge, a recess and a shoulder, and a rod mounted in the frame of the bicycle provided with a shoe designed to depress the dog and to register with the recess and the shoulder, with suitable connections to an operating-handle mounted on the bicycle-frame, substantially as set forth.

In testimony whereof I have hereunto set my hand this 31st day of May, 1895.

JOSEPH MUNDEN.

Witnesses:
F. K. McCANCE,
C. M. CLARKE.